Nov. 16, 1965 R. L. PETERS 3,218,560

AVERAGING PULSE SYNCHRONIZING APPARATUS

Filed March 12, 1963

ROBERT L. PETERS
INVENTOR

BY Richard D. Stephens
ATTORNEY

United States Patent Office 3,218,560
Patented Nov. 16, 1965

3,218,560
AVERAGING PULSE SYNCHRONIZING APPARATUS

Robert L. Peters, Sunnyvale, Calif., assignor to General Precision, Inc., Binghamton, N.Y., a corporation of Delaware Filed Mar. 12, 1963, Ser. No. 264,623
12 Claims. (Cl. 328—39)

This invention relates to apparatus for accurately synchronizing the operation of electronic apparatus with clock or timing pulses, and more particularly, to apparatus for synchronizing locally-generated timing signals with remotely-generated and locally-received timing signals having an undesirable "random jitter" or deviation in timing due to transmission channel limitations. In a variety of communications and automatic control applications, it is necessary or desirable to be able to synchronize the operations of local apparatus with the operations of a remote apparatus, and such synchronization usually is done by transmitting timing signals from one apparatus to the other, over telephone lines, cables, radio links, or the like. Where the distance between the remote apparatus and the local apparatus is established, and when the general characteristics of the communications channel linking them are known, a basic, fixed and predictable transmission time which it takes to send timing signals from one location to the other may be computed, but where random and varying transmission delays occur, it frequently becomes impossible or impractical to compensate or correct sufficiently for such random delays, and then it becomes very difficult to synchronize local apparatus with remote apparatus with a desired accuracy. For example, if a telephone line of known characteristics is strung between two locations which are separated by perhaps a hundred miles, one may measure or calculate a nominal transmission time for a timing pulse to travel the length of the line, and then advance the operation of the apparatus at the receiving location to compensate for the nominal transmission time. Since the actual transmission time may vary from the nominal transmission time due to temperature, for example, and a variety of other varying environmental influences, one cannot compute easily nor compensate easily for a certain amount of variation in transmission time, and to the extent one cannot compensate for such random variation the attempted synchronization of the two systems is inaccurate.

One application which requires a very precise synchronization of timing signals at plural widely separated locations is missile tracking. In order to determine missile speed accurately, it is necessary to establish with great precision the relative times at which successive photographs are taken at successive camera locations spaced on the ground along the general route of the missile. In such applications, a centrally located control station situated at the launch area, for example, provides basic or master timing signals, and these signals are transmitted to various remote camera locations by means of radio or telephone circuits, over distances as great as several hundred miles, for example. The timing signals are needed at the remote camera installations in order to trip camera shutters at precisely the right times and for similar purposes, and thus a pulse generator at a given camera site must be timed in precise relationship to the master pulse generator at the launch area. While an average or nominal transmission delay may be computed or measured and then compensated for by advancing the pulse generator at the camera site, such a host of varying factors contribute variable amounts of transmission delay that they have not been able to be calculated nor fixedly compensated for in the prior art with sufficient precision. Thus, it is a primary object of the present invention to provide improved apparatus for more accurately synchronizing the local generation of timing signals with timing signals which have been received over a communications channel having random jitter or variable transmission time characteristics. It may be noted in passing that while certain components or causes of the variations in transmission time are not truly "random," in that they may vary in known relationship with various conditions, such as temperature, and with a variety of more rapidly changing conditions, too, the relationships are collectively so complex as to defy convenient calculation for any usual communications channel of the type and size utilized, so that as a practical matter, the entire variation in transmission time may be regarded as random. Changes in sun spot activity and changes in the ionosphere will affect radio transmission. Changes in interference induced from power lines and changes in conductor spacing with wind loading, etc. will affect telephone line transmission. In any communications link of practical length, the precise effects of such changes are so complex as to defy ready calculation.

It has been discovered that a marked improvement in synchronization accuracy may be achieved by assuming that the random jitter or time deviations of a seelcted group of timing signals deviate from correct or ideal timing in accordance with the Gaussian probability distribution, and by compensating the local timing signal generator so that it is synchronized with the "averaged time of occurrence" of the pulses of the selected group. Thus the invention incorporates means for averaging the times of occurrence of a group of successive pulses which have been received over a communications channel and thereby determining the proper pulse timing for a local pulse generator, so that the pulses from the local pulse generator may, on the average, be exactly synchronized with the pulses occurring at the remote master transmitter location.

In the ballistic camera installation for which the invention originally was devised, the master pulse generator or clock was arranged to provide pulses at a repetition rate of one per second. The problem was somewhat complicated, however, by the fact that only 59 pulses were transmitted each 60 seconds, the transmission of one pulse being omitted each minute in order to signify the beginning of successive minute intervals, and in addition, two successive pulses were omitted once each hour to signify the beginnings of hour intervals. The occasional omission of clock pulses to identify the beginnings or endings of significant intervals is a well-known technique used in various synchronization systems, but such omissions complicate computation of the average time of occurrence of received pulses, since the computation means must not interpret the time between two pulses which bracket an intentionally omitted pulse as a single but erroneously long pulse interval. Thus simple systems which merely count the number of pulses received in a known time interval are incapable of computing the average time of occurrence in systems where some of the timing pulses with which synchronization must be achieved have been intentionally omitted. Therefore, it is a further object of the present invention to provide synchronization apparatus of the general type described which will provide locally-generated pulses properly in synchronism with master pulses even though occasional master pulses are omitted.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which.

Figures 1, 2, 3:
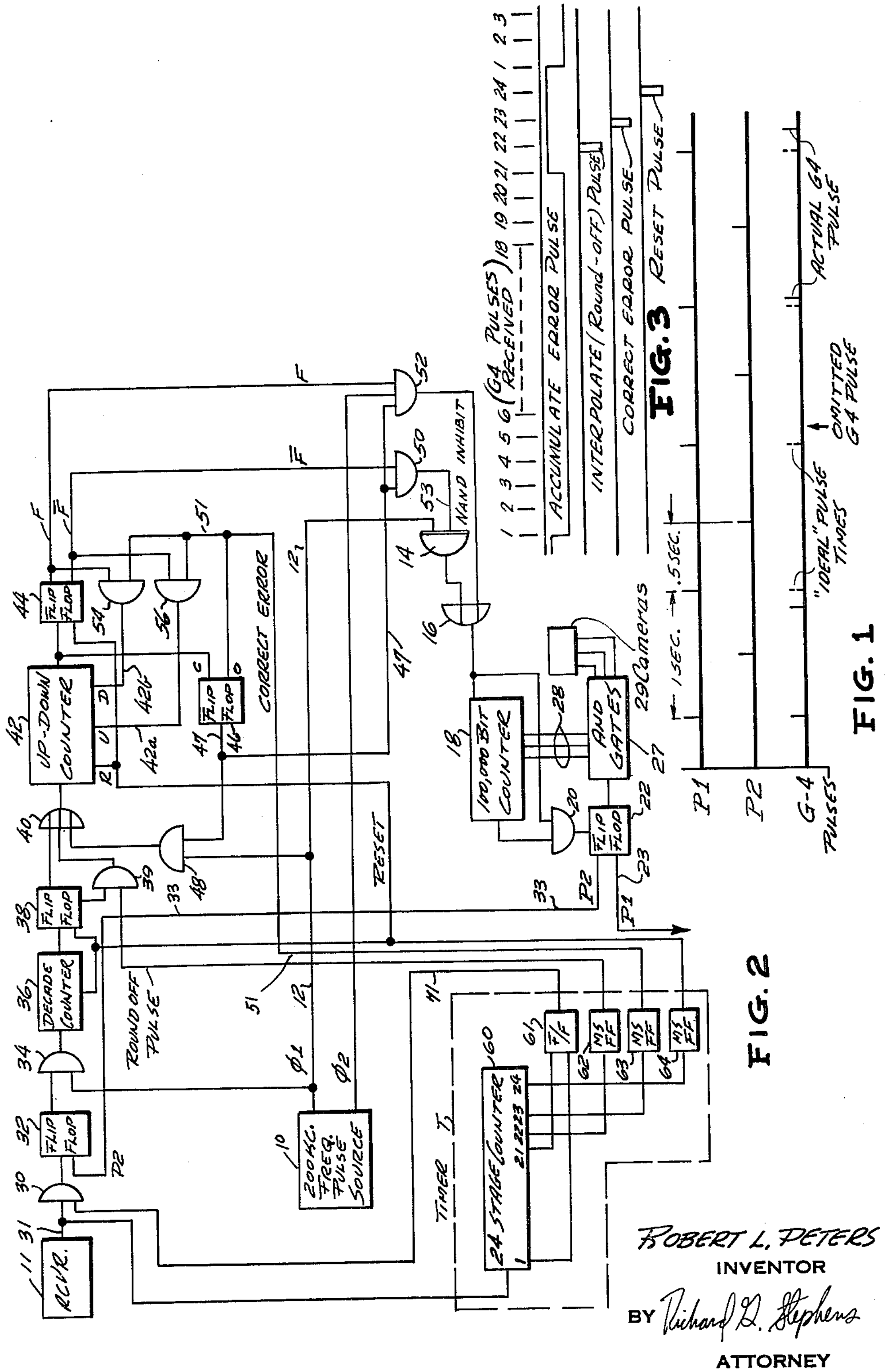
FIG. 1 is a timing diagram illustrating actual and ideal time relationships between locally generated pulses P–1 and P–2 and remotely-generated locally-received pulses G–4 which have been transmitted over the communications channel.
FIG. 2 is an electrical schematic diagram in block form illustrating one form of the invention.
FIG. 3 is a timing diagram illustrating the operation of timing unit T of FIG. 2.

Starting with an assumption that the actual times of occurrence of the received master clock pulses are grouped about ideal or theoretically proper times of occurrence in accordance with a Gaussian distribution function, the time distribution $P_{(x)}$ of the received master clock pulses may be represented by the following equation:

$$P_{(x)}=\frac{}{\sqrt{2\pi\sigma^2}}e^{-\frac{(x-x_0)^2}{2\sigma^2}} \quad (1)$$

wherein $x_0$ is the fixed or predictable time delay in the communications channel, $x$ is the additional time deviation due to random or unpredictable factors affecting transmission time of a pulse over the communications channel, and $\sigma$ is an assumed maximum deviation in time from ideal or theoretically correct time that any pulse is believed likely to have.

If a plurality of N received master clock pulses are considered, the time distribution, if the random timing deviations or jitter are averaged over the group, may be expressed as follows:

$$P_{(x)}=\frac{1}{\sqrt{2\pi\frac{\sigma}{N}^2}}e^{-\frac{(x-x_0)^2N}{2\sigma^2}} \quad (2)$$

By re-arrangement of Equation 2, the average time deviation from ideal or theoretically correct time may be specified as follows:

$$\sigma_{\text{avg.}}=\frac{\sigma}{\sqrt{N}} \quad (3)$$

Equation 2 may be solved for N to determine the number of pulses which must be averaged to provide a given average deviation for a system with a given maximum deviation.

$$N=\frac{\sigma^2}{\sigma^2_{\text{avg.}}} \quad (4)$$

Thus if a communications channel provides a maximum time deviation $\sigma$ in some pulses of 20 microseconds ahead or behind the ideal time, and if an average deviation $$(\sigma)_{\text{avg.}}$$

of no more than 4 microseconds is required, it will be seen from Equation 4 that the time deviations of $20^2/4^2$ or 25 successive received master clock pulses must be averaged in order to control the timing of locally generated signals within an accuracy of 4 microseconds. If the maximum time deviation caused by the communications channel is less than 20 microseconds, the number of pulses which must be averaged for a given timing accuracy is less, as is readily evident from Equation 4. In the specific system described below in detail, 20 successive time deviations were averaged to provide the accuracy desired, but it will become readily evident to those skilled in the art that other numbers of pulses may be averaged over a selected interval without departing from the teachings of the invention.

The synchronizing system of the present invention operates to receive a first plurality of N successive master clock pulses (which have been transmitted over a communications channel and which therefore arrive at the synchronizing system with a variable time jitter), to generate locally a similar plurality of N successive timing pulses at a repetition rate corresponding to the repetition rate of the received master clock pulses, to compare the time of occurrence of each received clock pulse in the first plurality with the time occurrence of its counterpart pulse in the second plurality and thereby determine the time deviation of each of the received master clock pulses from its counterpart locally-generated pulse to compute the average of the deviations occurring over N comparisons, and then to control the mentioned local generation of the pulses in accordance with the computed average, so that the local pulse generating means is slaved to or synchronized exactly with the times at which all the received master clock pulses would occur if they had no random jitter.

Referring to FIG. 2, the invention will be seen to include a basic frequency-standard clock pulse source 10 which provides output pulses φ1 and φ2 at a 200 kc. rate, with the pulses of one phase displaced 180 degrees from the pulses of the other phase, so that the φ1 and φ2 pulses occur alternately every 2.5 microseconds and a pulse occurs on each individual output line every 5 microseconds. If an accurately controlled 200 kc. oscillator is connected to feed a flip-flop (not shown), the transition time signals of the two sections of the flip-flop may be used as the φ1 and φ2 pulses. The φ1 pulses on line 12 are applied through NAND gate 14 and thence through OR gate 16 to a 100,000 bit pulse counter 18, and thence through AND gate 20 to the flip-flop 22. Pulse counter 18 and flip-flop 22 divide the 200 kc. repetition rate by factors of 100,000 and two, respectively, so that output pulses (P–1 and P–2) are provided from flip-flop 22. As shown in FIG. 1, the P–1 and P–2 pulses are phase displaced by a half second with respect to each other and each occurs once per second. Assuming that flip-flop 22 is an ordinary two-section flip-flop, the P–1 and P–2 pulse may be considered to occur at the leading edges of the pulses from the two sections of the flip-flop, and flip-flop 22 may include RC coupling to differentiate the voltage from each section and diodes to prevent transmission of the trailing edge transients, in accordance with well-known techniques.

When synchronization is achieved, the P–1 pulses will occur exactly in synchronism with the average of the received G–4 pulses, and the P–2 pulses will occur exactly 0.5 second displaced from the P–1 pulses and the average of the received G–4 pulses. The P–1 and P–2 pulses may be routed directly to control various utilization devices (not shown) which one wishes to synchronize. Where one wishes to time the operation of various devices to occur at known times ahead of or behind the P–1 and P–2 pulses, to compensate for fixed and known transmission delays, for example, or to compensate for the time required to actuate certain devices as another example, the P–1 and P–2 signals may be "AND" ed with outputs from selected stages of counter 18 to provide output signals at any desired phases of the P–1 and P–2 signals. In FIG. 2 one of the flip-flops 22 outputs is shown connected to a plurality of AND gates 27 which are also connected individually to selected stages of counter 18 via lines 28, to provide shutter-actuating signals to a plurality of cameras 29.

The system contemplates that the received master clock timing pulses (frequently referred to hereinafter as "G–4" pulses) received over the transmission channel should occur simultaneously with the P–1 pulses on line 23, and hence occur exactly one-half second displaced from the P–2 pulses on line 33, but due to the variable timing deviations resulting from transmission, the master clock or G–4 pulses actually frequently occur several microseconds ahead of or behind ideal time, and occasionally a G–4 pulse will be intentionally omitted, as mentioned above. In FIG. 1, the ideal pulse times at which master G-4 pulses should be received are shown in dashed lines and representative, slightly displaced times at which they actually occur are shown in solid lines.

The manner in which the time deviations of a group of successive G–4 pulses may be averaged will now be explained. The radio receiver 11 or telephone line or the like over which the master G–4 signals are received is connected to apply the G–4 pulses via line 31 and a gate 30 to flip-flop 32, to turn on flip-flop 32 and enable AND gate 34 as soon as a G–4 pulse is received. Flip-flop 32 will remain on and AND gate 34 will remain enabled until occurrence of a P–2 pulse on line 33 turns off flip-flop 32. During perfect synchronization, when G–4 pulses are occurring exactly at the same instants as P–1 pulses, G–4 pulses will be seen to be occurring exactly one-half second displaced from P–2 pulses, and hence during perfect synchronization, AND gate 34 would be enabled for exactly one-half second each time a G–4 pulse is received. The enabling of AND gate 34 passes the 200 kc. $\phi 1$ clock pulses to decade counter 36 and flip-flop 38, which together divide the total number of pulses passed through AND gate 34 by factors of ten and two, respectively, and the output pulses from flip-flop 38 are applied through OR gate 40 to reversible counter 42. During ideal synchronization, each received G–4 pulse results in AND gate 34 being enabled for exactly 0.5 second, as explained above, and exactly 100,000 of the 200 kc. $\phi 1$ pulses will be applied to decade counter 36, providing 10,000 pulses to flip-flop 38 and 5,000 pulses to reversible counter 42. With each ideally-timed G–4 pulse providing 5,000 pulses to counter 42, it will be seen that 20 successive ideally-timed G–4 pulses would cause counter 42 to count up to exactly 100,000, so that it would be in its zero count condition after 20 ideally timed G–4 pulses had been received.

If a G–4 pulse occurs later than its associated P–1 pulse, and hence less than 0.5 second before the following P–2 pulse, less than 5,000 pulses will be passed to counter 42 before gate 34 is disabled, and conversely, if a G–4 pulse occurs sooner than a P–1 pulse, more than 5,000 counts will be passed to counter 42. Thus if various G–4 pulses are late and others are early, some will cause less than 5,000 counts to pass to counter 42 and some will cause more than 5,000 counts, and after 20 successive G–4 pulses have been received the difference between the count in counter 42 and a count of 100,000 will be a measure of the average time deviation taken over 20 successive G–4 pulses.

An alternative arrangement may provide an up-down counter 42 of greater capacity, and the elimination of the divide-by-20 circuits 36–38. In the exemplary embodiment indicated above, the counter 42 may have a capacity to count 2 million bits and no divider circuit will be required preceding the counter. In this case, the total number of pulses received through the enabled gate 34 during 20 successive intervals would all be contained in the counter. Since the up-down counter is a rather expensive circuit component, and an economy is effected by using the arrangement shown in FIGURE 2 having a smaller counter which can only contain 100,000 bits rather than the larger 2 million bit capacity.

Counter 42 is connected to operate flip-flop 44 when the count passes from 99,999 through zero. After 20 successive G–4 pulses have been received, the state of conduction of flip-flop 44 will indicate whether the locally generated P–2 pulses (and hence the P–1 pulses) are occurring early or late with respect to the average timing of G–4 or master clock pulses received over the communications system. If the P–2 pulses are early with respect to the average timing of received G–4 pulses, counter 42 will not have reached a count of 100,000 after a complete counting cycle. A complete counting or averaging cycle involves receipt of 20 successive G–4 pulses, so that AND gate 34 will have been opened by 20 successive G–4 pulses and closed by 20 successive P–2 pulses. If a count of 100,000 is not reached during the complete counting cycle, flip-flop 44 will not be switched, and will remain in its reset state.

Upon the completion of an averaging cycle, timer unit T provides a "correct error" pulse on line 51 to set flip-flop 46, providing an enabling signal via line 47 so that 200 kc. $\phi 1$ clock pulses are passed through AND gate 48, and through OR gate 40 to counter 42. These 200 kc. pulses then "run out" counter 42, i.e., they advance counter 42 from whatever count it contained at the end of the averaging cycle up past its 99,999 count state to its zero count state. It will be seen that the time required to run out counter 42 will depend upon how much below 100,000 the count was in counter 42 at the end of the average cycle. The output signal taken from counter 42 when it reaches a zero count is used to switch flip-flop 46 so as to close gate 48, so that application of the 200 kc. $\phi 1$ pulses to counter 42 is interrupted as soon as the counter reaches zero count. During the time interval when counter 42 is being run out, the output signal on line 47 from flip-flop 46 is connected to enable one of AND gates 50 and 52. Since flip-flop 44 remains reset in the example being considered, the $\overline{F}$ signal from flip-flop 44 enables gate 50, and (via AND gate 56) energizes the "up" control line 42*a* of counter 42, and because of the absence of the F signal from flip-flop 44, AND gate 52 is not opened. The operation of AND gate 50 provides an inhibiting signal on line 53 to NAND gate 14, thereby preventing the passage of further 200 kc. $\phi 1$ pulses to counter 18, and because no P–1 and P–2 pulses can be generated unless counter 18 is running, it will be seen that generation of P–1 and P–2 pulses is suspended until counter 42 has been run out. When counter 42 has been run out, it will be seen that as a new 20-pulse G–4 pulse-counting cycle begins, it will be synchronized with the average time of occurrence of the 20 previous G–4 pulses which have been averaged.

Now assuming instead that the average of the G–4 pulses has been early with respect to the P–1 and P–2 pulses, after 20 successive G–4 pulses counter 42 will have counted to more than 100,000, and as the counter passed through zero count, a pulse will have been generated to set flip-flop 44, providing a signal on its F output line. The "correct error" pulse on line 51 from the timing unit T again results in AND gate 48 applying 200 kc. $\phi 1$ pulses to counter 42 via OR gate 40. Since flip-flop 44 has been set, the F signal opens gate 54, so that the "count down" control line 42*b* of counter 42 is now energized, and the count in counter 42 is then run down from whatever count it reached until it reaches a zero count, at which time the resetting of flip-flop 46 closes AND gate 48. During this run down interval, flip-flop 44 will be applying its F output signal to AND gate 52, so that 200 kc. $\phi 2$ clock pulses are routed through OR gate 16 to counter 18. Since there is no $\overline{F}$ signal from flip-flop 44, no inhibit signal will operate NAND gate 14 and consequently 200 kc. $\phi 1$ pulses also will be routed simultaneously to counter 18 via OR gate 16. It will be recalled that the 200 kc. $\phi 1$ and $\phi 2$ pulses occur alternately, and hence counter 18 will be fed 400,000 pulses per second and thereby be driven at twice its normal rate of speed during the time it takes to run down counter 42 to zero. When counter 42 has been run down to zero, the resetting of flip-flop 46 causes gate to be closed, interrupting the passage of $\phi 2$ pulses to counter 19, but $\phi 1$ pulses will continue to be applied via gates 14 and 16, and hence counter 18 then will proceed to count again at its normal 200 kc. rate. It will be seen that since generation of the P1 and P2 output pulses depends upon the operation of counter 18, the temporary speeding up of counter 18 by causing it to count at a double rate advances the generation of P1 and P2 pulses, so that they are shifted in time with respect to the average of 20 G–4 pulses, and as a new 20 G–4 pulse counting cycle begins, it will be synchronized with the average timing of the preceding 20 G–4 pulses.

It will be recalled that approximately 5000 counts are provided from flip-flop 38 in approximately one-half second each time a G–4 pulse is received, assuming approximate synchronization, and that approximately a 100,000 count will exist in counter 42 after 20 G–4 pulses have been received. It also will be recalled that decade counter 36 and flip-flop 38 together divide the number of pulses applied to them by 20, so that one state (the reset state) of flip-flop 38 represents a count between zero and ten and the other state (the set state) represents a count between ten and twenty. By sensing the condition of flip-flop 38 after a complete counting cycle, the count in counter 42 may be rounded off to the nearest 20 count by applying a roundoff pulse to counter 42 if flip-flop 38 is in its set state at the end of the cycle, but not applying the roundoff pulse if flip-flop 38 is in its reset state at such time. Timer unit T applies a roundoff pulse briefly to AND gate 39 just after the receipt of the 20th G–4 pulse, and since AND gate 39 is connected to the set output of flip-flop 38, a single further pulse will be applied to counter 42 if flip-flop 38 is in its set state after 20 G–4 pulses have been received.

The simplified timer unit T in FIG. 2 is shown as including a 24-stage electronic pulse counter 60 connected to be advanced by successive G–4 pulses as they appear on input line 31. Receipt of a first G–4 pulse advances counter 60 from its "one" count to its "two" count, etc., and hence receipt of a 20th G–4 pulse will advance counter 60 to its 21 count. The No. 1 stage of counter 60 is connected to set flip-flop 61 when counter 60 reaches its "1" count, and the No. 21 stage of counter 60 is connected to reset flip-flop 61 when counter reaches it "21" count. Flip-flop 61 thereby provides an "accumulate error" pulse having a time duration which signifies the 20 received pulse averaging period. This pulse is routed on line 71 to enable the AND gate 30 such that successive G–4 pulses will be passed to set the flip-flop 32 only during the averaging period of the "accumulate error" pulse. The No. 22, 23 and 24 stages of counter 60 are routed respectively to individual monostable flip-flops 62, 63 and 64. Upon occurrence of a "22" count, flip-flop 62 generates the roundoff pulse mentioned above. Upon occurrence of a "23" count, flip-flop 63 generates the "correct error" pulse required on line 51 to operate AND gates 54 and 56 and flip-flop 46. Upon occurrence of a "24" count, flip-flop 64 provides a reset pulse which resets up-down counter 42 to its zero count condition, and then upon receipt of the next G–4 pulse, a new averaging cycle ensues as counter 60-recycles to its "1" count condition.

It now may be readily understood why synchronization with the average timing of the G–4 pulses is in no way affected by the omission of one or several G–4 pulses. The stopping or speeding up of counter 18 in order to delay or advance generation of P–1 and P–2 output pulses is not done until a "correct error" pulse is provided on line 51, and it will be evident that no such pulse is applied to line 51 until counter 60 has received twenty-three G–4 pulses to set it to its "23" count condition, and hence if one or several G–4 pulses are omitted, the system merely waits until additional G–4 pulses are received before generating the "correct error" pulse. Since the system waits until twenty G–4 pulses are received before beginning its error correction procedure, it will be clear that the count present in the up-down counter 42 when error correction is initiated is certain to represent the total counts applied to counter 42 during the occurrence of exactly twenty received G–4 pulses, even though the twenty pulses are spaced about a gap during which one or more G–4 pulses were intentionally omitted from the transmitted G–4 pulse train.

Under normal operation, the synchronizing apparatus of this invention will repeatedly pass through the cycle of accumulate error, roundoff, correct error, and reset. Thus, the apparatus of this invention will repeatedly correct the synchronization of the locally generated P1 and P2 pulses in accordance with the average timing of groups of received G–4 pulses. Although the 200 kc. frequency clock source 10 may be subject to drift as compared to the remote master clock source, the continuous correction will keep the systems synchronized and the oscillator drift will ordinarily be of no great consequence. However, the local clock source will have a degree of accuracy such that the interruption of the received G–4 pulses due to failure of the communication circuit or receiver 11 will have no immediate adverse effect upon the operation of the system. In the ballistic camera control system discussed heretofore, the system may be initially synchronized with averaged G–4 clock pulses and will thence operate for a substantial period of time even though the communication channel has failed and no further G–4 clock pulses are received. After resumption of the G–4 clock pulses, the system will again continue to correct synchronization errors as before.

At the 24th count or conclusion of each synchronizing operation, a reset pulse is generated and applied to the decade counter 36, the flip-flop 38, the up-down counter 42, and the flip-flop 44. Although the up-down counter 42 has been counted out during each operation, experience has shown that such a circuit may jitter, and may be inaccurate by one pulse count. Therefore, it is desirable that the reset pulse be applied to the up-down counter 42 in addition to the other elements which must be reset prior to the next operation.

Each of the devices shown in block form in FIG. 2 is a well-known digital computer component available in a variety of forms, and numerous equivalent elements will be recognized by those skilled in the art to be readily substitutable in accordance with well-known techniques.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. Apparatus for synchronizing locally generated pulses with the average timing of a first train of pulses having a known repetition rate but varying deviations in timing of individual pulses of said train from said repetition rate, comprising, in combination: first means for locally generating a second train of pulses having a repetition rate which is a multiple of said known repitition rate; second means including repetition rate dividing means and first gating means responsive to said second train of pulses for providing a third train of output pulses at said known repetition rate; third means for comparing the relative times of occurrence of N pulses in said first and third trains and for providing N signals each representative of the time difference between occurrence of a pulse in said first train and occurrence of a pulse in said third train, N being a selected number; fourth means for accumulating said N signals; and first control means responsive to said fourth means for controlling the operation of said second means, thereby to establish the times of occurrence of said output pulses of said third train at known time spacings relative to the average timing of said first train of pulses.

2. Apparatus according to claim 1 in which said second means is operative to provide a further train of output pulses having predetermined time spacings relative to said output pulses of said third train, and in which said first control means establishes the times of occurrence of said output pulses of said third train at a time spacing such that said output pulses of said further train occur simultaneously with the average timing of said first train of pulses.

3. Apparatus according to claim 1 in which said first control means is operative to delay or speed up operation of said second means in accordance with the difference between the accumulated sum of said N signals in said fourth means and a predetermined value.

4. Apparatus according to claim 1 in which said third means includes a re-cycling program control means connected to be advanced by pulses of said first train, whereby exactly N of said signals are provided to said fourth means during each cycle of said re-cycling program control means even if pulses are occasionally omitted from said first train.

5. Apparatus according to claim 1 in which said first means is also operative to provide a fourth train of pulses having the same repetition rate as said second train of pulses and phase displaced with respect to said second train of pulses, and in which said first gating means is connected to be controlled by said first control means after accumulation of said N signals in said fourth means either to block application of said second train of pulses to said second means and thereby delay generation of said third train of pulses, or to apply both said second and fourth trains of pulses to said second means and thereby advance the generation of said third trains of pulses.

6. Apparatus according to claim 1 in which said third means includes second gating means for controlling application of said second train of pulses to said fourth means, said second gating means being connected to be opened upon occurrence of a pulse in said first train and subsequently closed upon occurrence of a pulse in said third train.

7. Apparatus according to claim 1 in which said forth means comprises a reversible electronic pulse counter.

8. Apparatus according to claim 2 in which said output pulses of said further train are spaced exactly intermediate said output pulses of said third train .

9. Apparatus according to claim 3 in which said fourth means comprises a reversible electronic pulse counter, and in which said control means is operative after accumulation of said N signals in said pulse counter either to delay or speed up operation of said second means for the period of time required for pulses of said second train to drive said pulse counter from the count condition it had attained after accumulation of said N signals to a predetermined count condition representing said predetermined value.

10. Apparatus according to claim 4 in which said recycling program control means includes a second pulse counter connected to be advanced by pulses of said first train, and in which said first control means is controlled by the count in said second pulse counter to delay or speed up operation of said second means only after N pulses of said first pulse train have advanced said second pulse counter to a predetermined count.

11. Apparatus for synchronizing locally generated pulses with the average timing of a first train of received pulses having a nominal repetition rate but varying deviations in individual pulses of said train from said nominal repetition rate, comprising, in combination:

a first pulse generator for locally generating a second train of pulses at a repetition rate which is a multiple of said nominal repetition rate;

a frequency divider circuit connected to receive said second train of pulses and operative to provide a third train of output pulses to an output circuit at said nominal repetition rate;

comparison means including a gate circuit connected to receive said first and third trains of pulses and to provide N signals upon occurrence of N pulses in said first train, each of said N signals being representative of the magnitude and the sense of the time difference between occurrence of a pulse in said first train and occurrence of a pulse in said third train, N being a selected number;

means for accummulating said N signals to provide, after the occurrence of said N pulses, a control signal commensurate in magnitude and sense with the averaged timing deviations of said N pulses from said nominal repetition rate;

and means for accelerating or delaying the operation of said frequency divider circuit in accordance with the magnitude and sense of said control signal.

12. Apparatus according to claim 11 in which said means for accummulating said N signals comprises a recycling reversible counter means, a second gate circuit connected to apply pulses from said second train to said reversible counter means, said second gate circuit being connected to be controlled by said N signals, and a bistable circuit connected to said counter means to be switched as said counter means re-cycles.

References Cited by the Examiner

UNITED STATES PATENTS

| | | | |
|---|---|---|---|
| 2,980,858 | 4/1961 | Grondin etal. | 328—63 |
| 3,069,568 | 12/1962 | Day. | |

ARTHUR GAUSS, *Primary Examiner.*